(12) United States Patent
Bian et al.

(10) Patent No.: US 11,567,277 B1
(45) Date of Patent: Jan. 31, 2023

(54) DISTRIBUTED BRAGG REFLECTORS INCLUDING PERIODS WITH AIRGAPS

(71) Applicant: GLOBALFOUNDRIES U.S. Inc., Malta, NY (US)

(72) Inventors: Yusheng Bian, Ballston Lake, NY (US); Mark Levy, Williston, VT (US); Siva P. Adusumilli, South Burlington, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/472,846

(22) Filed: Sep. 13, 2021

(51) Int. Cl.
  *G02B 6/43* (2006.01)
  *G02B 6/42* (2006.01)

(52) U.S. Cl.
  CPC ............. *G02B 6/43* (2013.01); *G02B 6/4206* (2013.01); *G02B 6/4212* (2013.01)

(58) Field of Classification Search
  None
  See application file for complete search history.

(56) References Cited

U.S. PATENT DOCUMENTS

| | | | |
|---|---|---|---|
| 5,315,128 A | 5/1994 | Hunt et al. | |
| 6,765,238 B2 | 7/2004 | Chang et al. | |
| 6,878,958 B2 | 4/2005 | Zhu | |
| 7,385,230 B1* | 6/2008 | Taylor | H01L 31/111 |
| | | | 257/107 |
| 8,537,870 B2 | 9/2013 | Jikutani et al. | |
| 8,625,942 B2 | 1/2014 | Na et al. | |
| 8,995,485 B2 | 3/2015 | Joseph et al. | |
| 9,028,157 B2 | 5/2015 | Na et al. | |
| 9,705,284 B1 | 7/2017 | Cheskis | |
| 9,864,138 B2 | 1/2018 | Coolbaugh et al. | |
| 10,622,498 B2 | 4/2020 | Wang et al. | |
| 2002/0036295 A1* | 3/2002 | Nunoue | H01L 33/105 |
| | | | 257/E33.068 |
| 2003/0006407 A1* | 1/2003 | Taylor | H01L 29/7785 |
| | | | 257/E29.25 |
| 2003/0031218 A1* | 2/2003 | Yeh | G02B 6/4249 |
| | | | 438/22 |
| 2004/0169245 A1 | 9/2004 | Unlu et al. | |
| 2008/0284326 A1* | 11/2008 | Choi | H01L 51/5212 |
| | | | 313/504 |
| 2017/0318632 A1* | 11/2017 | Simin | H01L 27/15 |
| 2018/0204761 A1 | 7/2018 | Feilchenfeld et al. | |

OTHER PUBLICATIONS

Bian et al., "Grating Couplers Integrated With One or More Airgaps", filed Oct. 29, 2020 as U.S. Appl. No. 17/084,186.

(Continued)

*Primary Examiner* — Chris H Chu
(74) *Attorney, Agent, or Firm* — Thompson Hine LLP; Anthony Canale

(57) ABSTRACT

Structures that include a distributed Bragg reflector and methods of fabricating a structure that includes a distributed Bragg reflector. The structure includes a substrate, an optical component, and a distributed Bragg reflector positioned between the optical component and the substrate. The distributed Bragg reflector includes airgaps and silicon layers that alternate in a vertical direction with the airgaps to define a plurality of periods.

20 Claims, 8 Drawing Sheets

(56) References Cited

OTHER PUBLICATIONS

Levy et al., "Switches in Bulk Substrate" filed May 3, 2021 as U.S. Appl. No. 17/306,078.
Bian et al., "Optical Antenna With Reflective Material for Photonic Integrated Circuit and Methods to Form Same", filed Jun. 22, 2021 as U.S. Appl. No. 17/354,408.
W. S. Zaoui et al., "CMOS-Compatible Polarization Splitting Grating Couplers With a Backside Metal Mirror," in IEEE Photonics Technology Letters, vol. 25, No. 14, pp. 1395-1397, Jul. 15, 2013.
F. Van Laere et al., "Compact grating couplers between optical fibers and Silicon-on-Insulator photonic wire waveguides with 69% coupling efficiency," in Optical Fiber Communication Conference and Exposition and The National Fiber Optic Engineers Conference, Technical Digest (CD) (Optical Society of America, 2006), paper PDP15.
Dirk Taillaert et al., "Compact efficient broadband grating coupler for silicon-on-insulator waveguides," Opt. Lett. 29, 2749-2751 (2004).
S. K. Selvaraja et al., "Highly efficient grating coupler between optical fiber and silicon photonic circuit," 2009 Conference on Lasers and Electro-Optics and 2009 Conference on Quantum electronics and Laser Science Conference, 2009, pp. 1-2.
Wissem Sfar Zaoui et al., "Cost-effective CMOS-compatible grating couplers with backside metal mirror and 69% coupling efficiency," Opt. Express 20, B238-B243 (2012).
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
Stijn Scheerlinck et al., "Efficient, broadband and compact metal grating couplers for silicon-on-insulator waveguides," Opt. Express 15, 9625-9630 (2007).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.
Y. Bian et al., "Monolithically integrated silicon nitride platform," 2021 Optical Fiber Communications Conference and Exhibition (OFC), 2021, pp. 1-3.
A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optical Society of America, 2021), paper W6A.1.
Hui Huang et al., "Long wavelength resonant cavity photodetector based on InP/air-gap Bragg reflectors," in IEEE Photonics Technology Letters, vol. 16, No. 1, pp. 245-247, Jan. 2004.

\* cited by examiner

DISTRIBUTED BRAGG REFLECTORS INCLUDING PERIODS WITH AIRGAPS

BACKGROUND

The present invention relates to photonics chips and, more specifically, to structures that include a distributed Bragg reflector and methods of fabricating a structure that includes a distributed Bragg reflector.

Photonics chips are used in many applications and systems, such as data communication systems and data computation systems. A photonics chip monolithically integrates optical components, such as waveguides, optical switches, grating couplers, and directional couplers, and electronic components, such as field-effect transistors, into a unified platform. Among other factors, layout area, cost, and operational overhead may be reduced by the integration of both types of components on the same substrate.

The coupling efficiency of optical components is limited due to light leakage into the substrate of the photonics chip. To reduce light leakage, a photonics chip may rely on a silicon-on-insulator substrate having a buried oxide layer of lower refractive index than the material(s) forming the optical components. However, the ability of a buried oxide layer to reduce light leakage into the substrate is limited by the amount of index contrast with the material(s) forming the optical components.

Improved structures that include structures that include a distributed Bragg reflector and methods of fabricating a structure that includes a distributed Bragg reflector are needed.

SUMMARY

In an embodiment of the invention, a structure for a photonics chip is provided. The structure includes a substrate, an optical component, and a distributed Bragg reflector positioned between the optical component and the substrate. The distributed Bragg reflector includes a plurality of airgaps and a plurality of silicon layers that alternate in a vertical direction with the plurality of airgaps to define a plurality of periods.

In an embodiment of the invention, a method of forming a structure for a photonics chip is provided. The method includes forming an optical component, and forming a distributed Bragg reflector including a plurality of airgaps and a plurality of silicon layers that alternate in a vertical direction with the plurality of airgaps to define a plurality of periods. The distributed Bragg reflector is positioned between the optical component and a substrate.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 2A is a top view of the structure in which FIG. 2 is taken generally along line 2-2.

DETAILED DESCRIPTION

Figure 1:
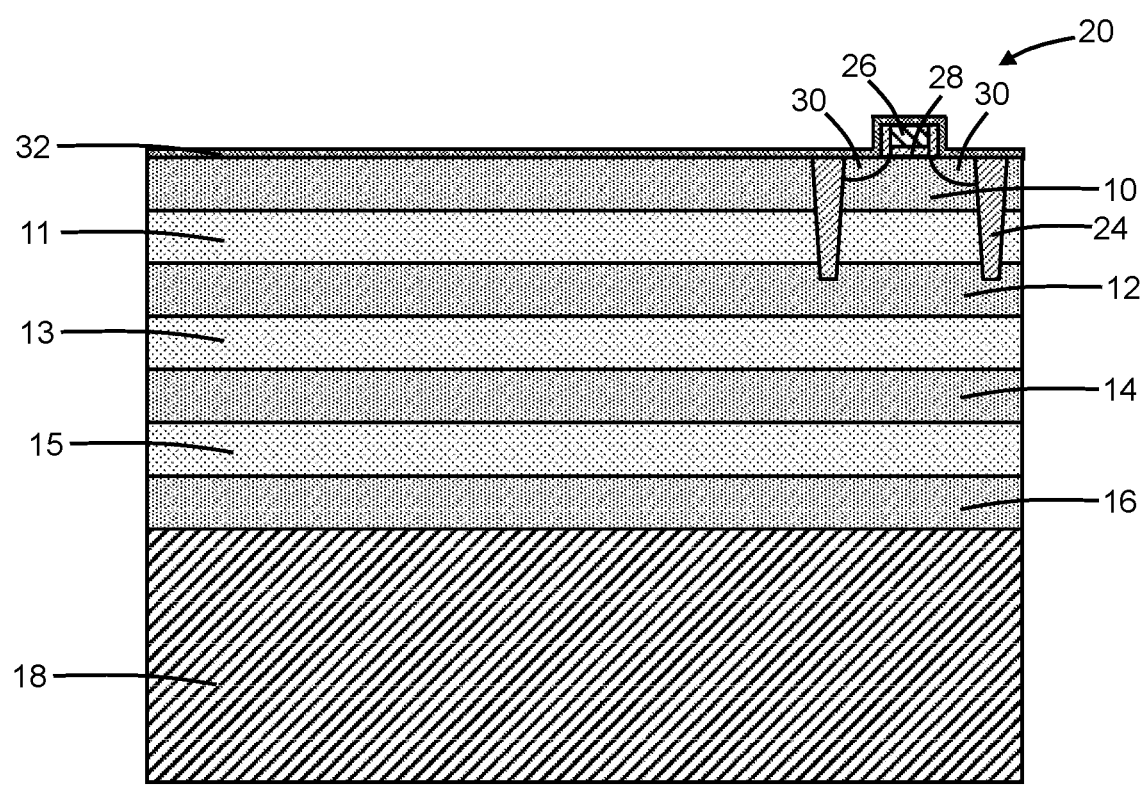
FIG. 1 is a cross-sectional view of a structure at an initial fabrication stage of a processing method in accordance with embodiments of the invention.

With reference to FIG. 1 and in accordance with embodiments of the invention, semiconductor layers 10, 12, 14, 16 and semiconductor layers 11, 13, 15 are formed in a layer stack on a substrate 18. The semiconductor layers 10, 12, 14, 16 alternate with the semiconductor layers 11, 13, 15 in the layer stack. The substrate 18 may be comprised of a semiconductor material, such as single-crystal silicon. The layer stack is epitaxially grown on the bulk substrate 18 using the semiconductor material of the substrate 18 as a growth seed and crystal structure template. In an embodiment, the semiconductor layers 10, 12, 14, 16 may have the same thickness. In an embodiment, the semiconductor layers 11, 13, 15 may have the same thickness. In an embodiment, the semiconductor layers 10, 12, 14, 16 and the semiconductor layers 11, 13, 15 may have the same thickness. In an embodiment, the semiconductor layers 10, 12, 14, 16 may have the same thickness, and the semiconductor layers 11, 13, 15 may have the same thickness that differs from the thickness of the semiconductor layers 10, 12, 14, 16.

The semiconductor layers 10, 12, 14, 16 may be comprised of a semiconductor material, such as single-crystal silicon. The semiconductor layers 11, 13, 15 may be comprised of a semiconductor material, such as silicon-germanium (SiGe), that can be etched and removed selective to the semiconductor material of the semiconductor layers 10, 12, 14, 16. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. In an embodiment, the semiconductor layers 11, 13, 15 may be comprised of silicon-germanium with a germanium content ranging from twenty percent (20%) to thirty-five percent (35%), which etches at a higher rate than the semiconductor layers 10, 12, 14, 16 exclusively comprised of silicon.

A device structure 20 is formed as an electronic component in a device region of the semiconductor layer 10 that is defined by a shallow trench isolation region 24. The device structure 20 may be an electronic component fabricated by front-end-of-line (FEOL) processing. The shallow trench isolation region 24 may extend through the semiconductor layer 10 and the semiconductor layer 11 to a shallow depth into the semiconductor layer 12. The shallow trench isolation region 24 may arranged in a trench etched by a masked etching process and may be comprised of a dielectric material, such as silicon dioxide, deposited by chemical vapor deposition into the trench and planarized.

In an embodiment, the device structure 20 may be a field-effect transistor that includes a gate electrode 26 and a gate dielectric 28 formed by deposition and patterning with photolithography and etching. The gate electrode 26 and gate dielectric 28 are positioned on a top surface of the semiconductor layer 10. The gate electrode 26 may be comprised of a conductor, such as doped polycrystalline silicon (i.e., polysilicon), and the gate dielectric 28 may be comprised of an electrical insulator, such as silicon dioxide. The device structure 20 may include other structural features such as source/drain regions 30 that are formed in the semiconductor layer 10. As used herein, the term "source/drain region" means a doped region of semiconductor material that can function as either a source or a drain of a field-effect transistor. In an embodiment, the source/drain regions 30 may be doped with an n-type dopant (e.g., arsenic or phosphorus). In an alternative embodiment, the source/drain regions 30 may be doped with ions of a p-type dopant (e.g., boron). In alternative embodiments, the device structure 20 may be a heterojunction bipolar transistor, a junction field-effect transistor, or a different type of electronic component.

A dielectric layer 32 is formed over the semiconductor layer 10 and may conformally coat the device structure 20. The dielectric layer 32 may be comprised of a dielectric material, such as silicon nitride, deposited by chemical vapor deposition or atomic layer deposition. In an embodiment, the dielectric layer 32 may provide a stress liner and/or a barrier layer.

Figure 2:
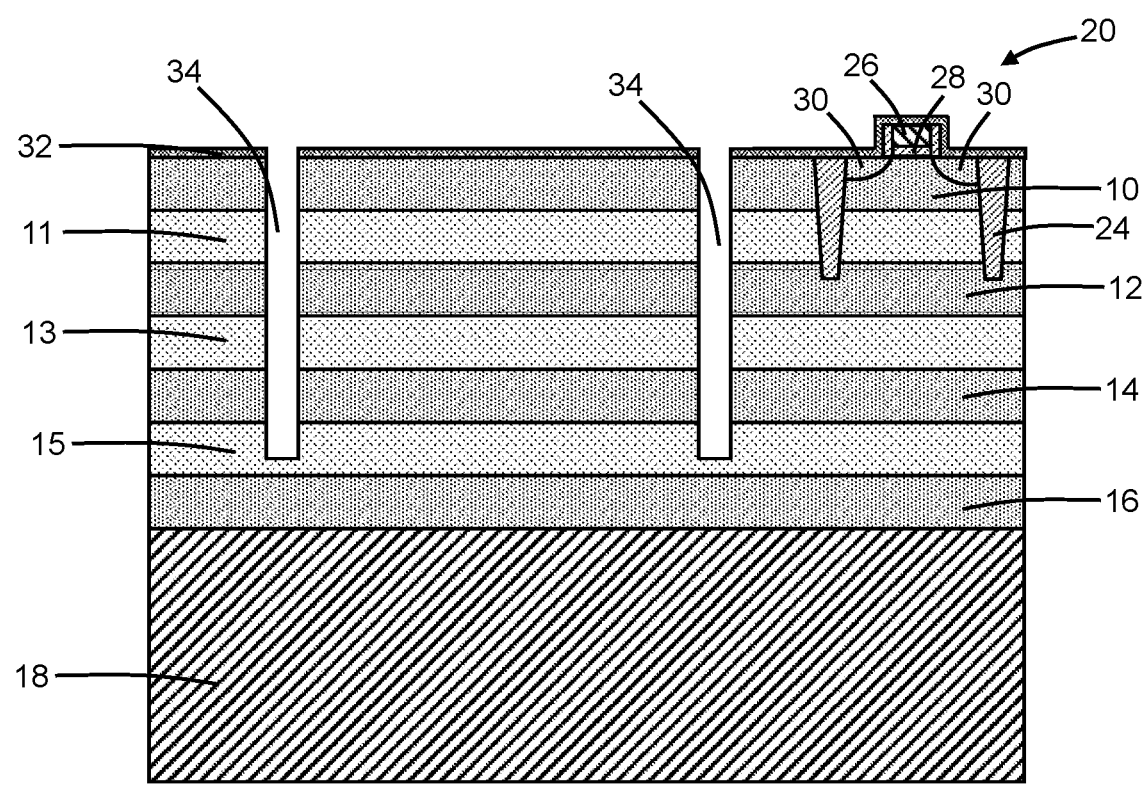
FIG. 2 is a cross-sectional view of the structure at a fabrication stage of the processing method subsequent to FIG. 1.
Figure 2A:
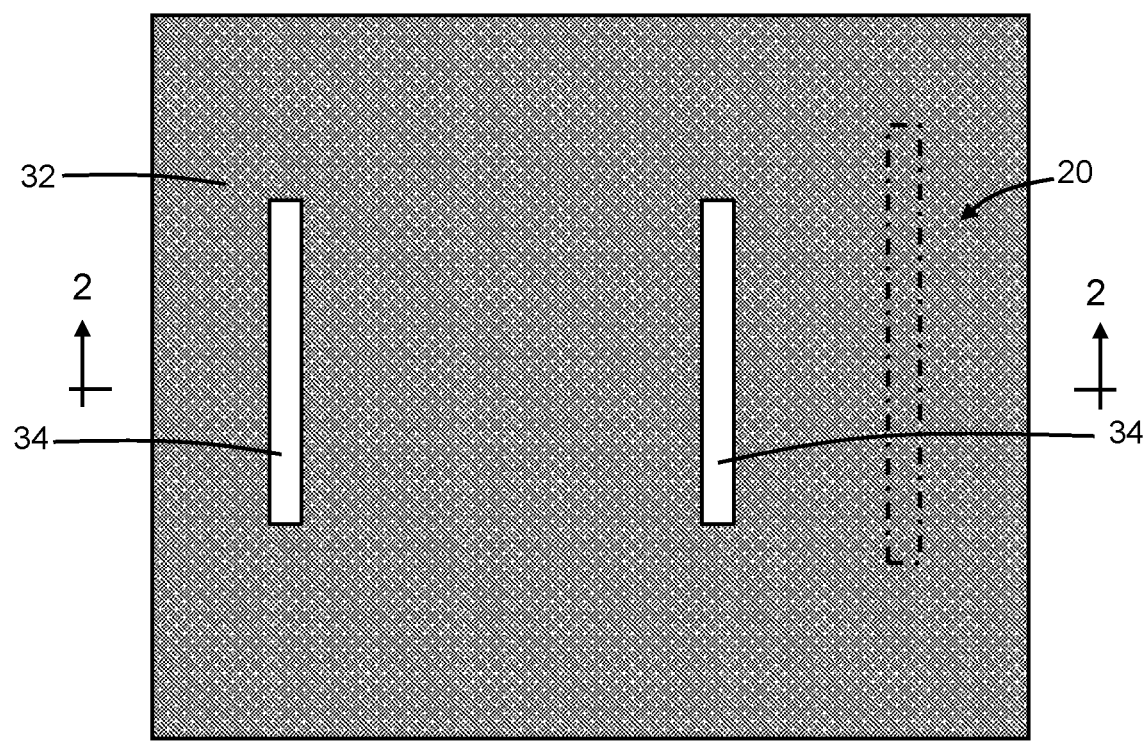

With reference to FIGS. 2, 2A in which like reference numerals refer to like features in FIG. 1 and at a subsequent fabrication stage of the processing method, the dielectric layer 32 is patterned using lithography and etching to form openings, and then the patterned dielectric layer 32 is used as a hardmask to form corresponding openings 34 that may penetrate through the semiconductor layers 10, 12, 14 and the semiconductor layers 11, 13, 15. In an embodiment, the openings 34 may terminate before extending into the bottommost semiconductor layer 16 in the layer stack. The openings 34 provide access to the semiconductor layers 11, 13, 15 for a subsequent isotropic etching process that is used to selectively remove the semiconductor layers 11, 13, 15. The openings 34 may be formed using a directional etching process, such as reactive ion etching, at the locations of the openings previously patterned in the dielectric layer 32. The openings 34 may be arranged as parallel lines with a length in one lateral direction of a plane and may be formed with a given width and spacing in the orthogonal lateral direction of the plane.

Figure 3:
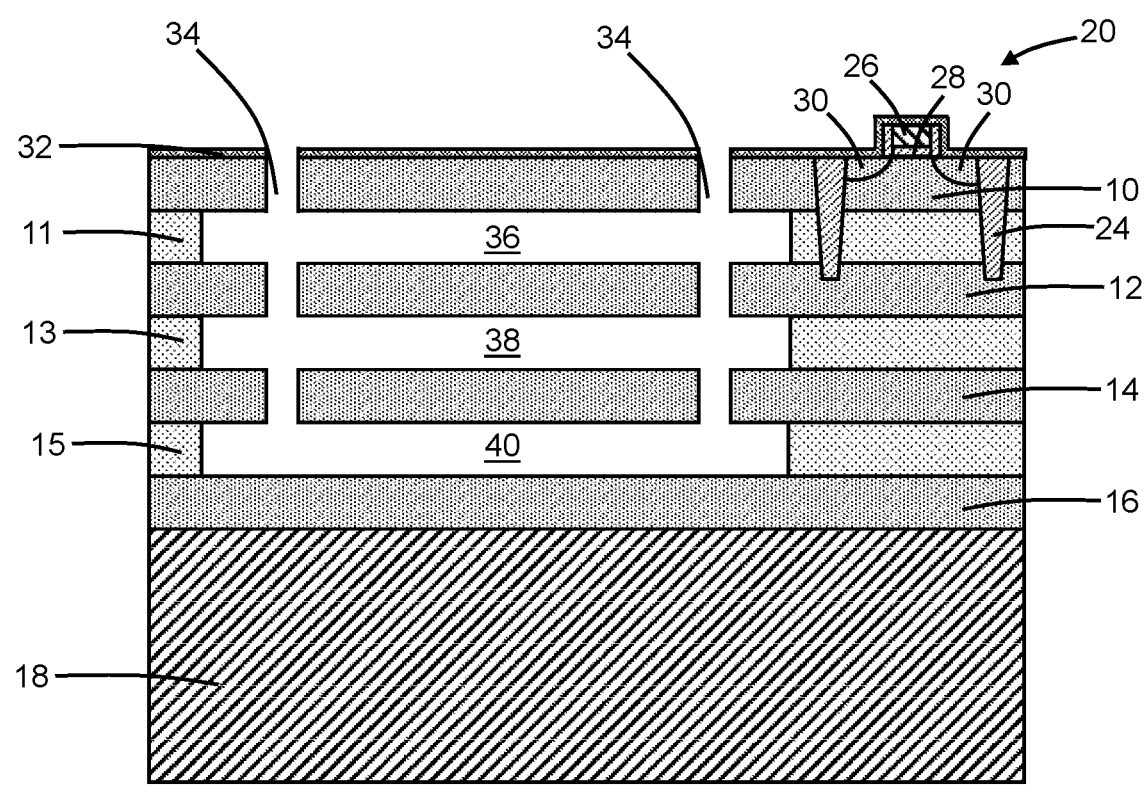
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage of the processing method, cavities 36, 38, 40 are formed between the semiconductor layers 10, 12, 14, 16 that extend outwardly from the openings 34. The cavities 36, 38, 40 may be formed by laterally recessing the semiconductor layers 11, 13, 15 relative to the semiconductor layers 10, 12, 14, 16 using an isotropic etching process that removes the semiconductor material of the semiconductor layers 11, 13, 15 selective to the semiconductor material of the semiconductor layers 10, 12, 14, 16. The openings 34 provide access to the semiconductor layers 11, 13, 15 for performing the isotropic etching process. In an embodiment, the isotropic etching process may rely on an etch chemistry, such as hot ammonia and/or hydrochloric acid vapor, that removes the material (e.g., silicon-germanium) of the semiconductor layers 11, 13, 15 selective to the material (e.g., silicon) of the semiconductor layers 10, 12, 14, 16.

The cavities 36, 38, 40 extend laterally in a horizontal direction relative to the openings 34. The cavity 36 is arranged in a vertical direction between the semiconductor layer 10 and the semiconductor layer 12, the cavity 38 is arranged in a vertical direction between the semiconductor layer 12 and the semiconductor layer 14, and the cavity 40 is arranged in a vertical direction between the semiconductor layer 14 and the semiconductor layer 16. The openings 34 extend through the semiconductor layers 10, 12, 14 and thereby connect the cavities 36, 38, 40. The height of the cavities 36, 38, 40 may be equal, or substantially equal, to the thickness of the semiconductor layers 11, 13, 15. In an embodiment, the cavities 36, 38, 40 may be rectangular or substantially rectangular.

The isotropic etching process may be controlled such that sections of the semiconductor layers 11, 13, 15 are intact at the peripheral edges of the cavities 36, 38, 40. In an embodiment, the intact sections of the semiconductor layers 11, 13, 15 may be interleaved with the semiconductor layers 10, 12, 14, 16 beneath the device structure 20. The portions of the openings 34 extending through the semiconductor layers 10, 12, 14 are not widened, or are only negligibly widened, by the isotropic etching process due to the etch selectivity.

Figure 4:
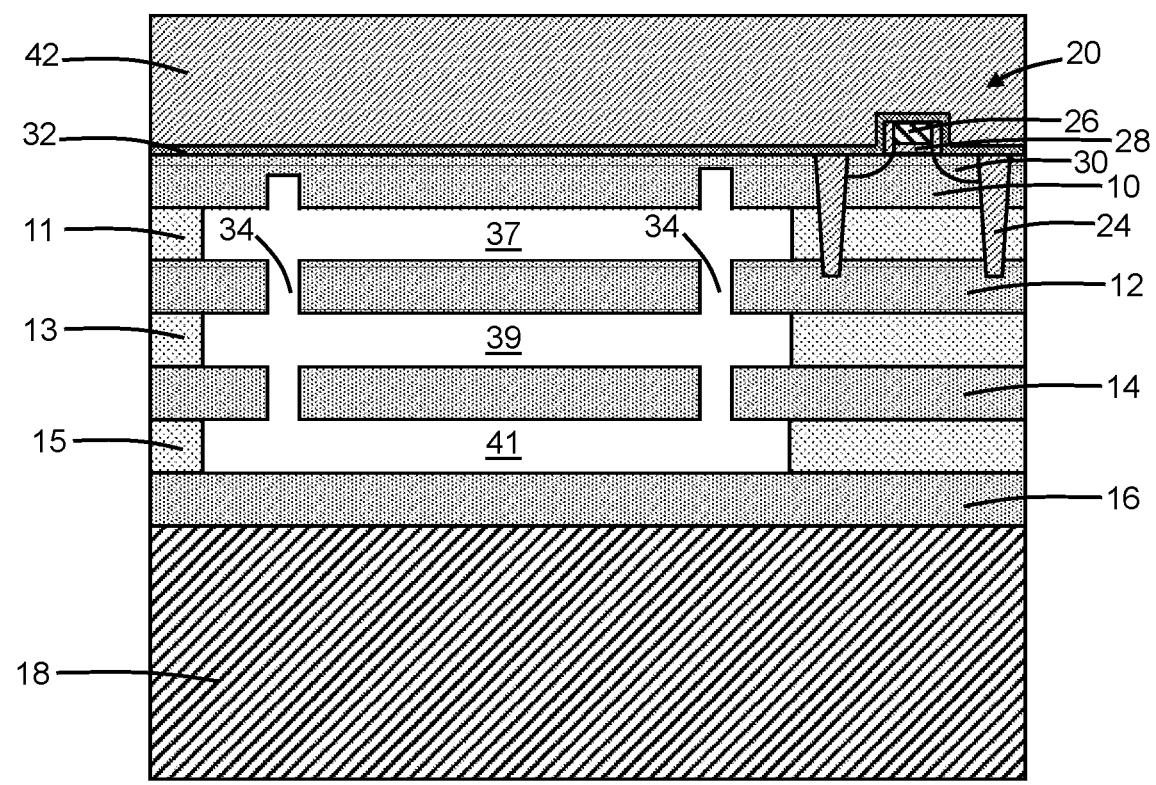
FIG. 4 is a cross-sectional view of the structure at a fabrication stage of the processing method subsequent to FIG. 3.

With reference to FIG. 4 in which like reference numerals refer to like features in FIG. 3 and at a subsequent fabrication stage of the processing method, a dielectric layer 42 may be deposited by middle-of-line processing over the dielectric layer 32. The dielectric layer 42 may be comprised of a dielectric material, such as silicon dioxide, that is deposited by chemical vapor deposition and planarized by chemical-mechanical polishing. Portions of the dielectric layer 42 fill and occlude a portion of each opening 34 (FIG. 3) in the semiconductor layer 10. Portions of the dielectric layer 42 may deposit on the semiconductor layers 12, 14 adjacent to the openings 34 and on the semiconductor layer 16 at the base of the openings 34 before the dielectric layer 42 pinches off the entrance to each opening 34.

After forming the dielectric layer 42 that occludes the openings 34 and seals the cavities 36, 38, 40 (FIG. 3), airgaps 37, 39, 41 are trapped or formed inside the sealed cavities 36, 38, 40. The semiconductor layers 10, 12, 14 are arranged to alternate in a vertical direction with the airgaps 37, 39, 41 to define a plurality of periods of a distributed Bragg reflector. The airgap 37 is arranged in a vertical direction between the semiconductor layer 10 and the semiconductor layer 12, the airgap 39 is arranged in a vertical direction between the semiconductor layer 12 and the semiconductor layer 14, and the airgap 41 is arranged in a vertical direction between the semiconductor layer 14 and the semiconductor layer 16. Each of the airgaps 37, 39, 41 is laterally bounded at it periphery by the sections of the semiconductor layers 11, 13, 15 that remain intact following the formation of the cavities 36, 38, 40.

The airgaps 37, 39, 41 are sealed and isolated volumes that may be filled by atmospheric air at or near atmospheric pressure, may be filled by another gas at or near atmospheric pressure, or may contain atmospheric air or another gas at a sub-atmospheric pressure (e.g., a partial vacuum). The airgaps 37, 39, 41 may be characterized by a permittivity or dielectric constant of near unity (i.e., vacuum permittivity), which is less than the dielectric constant of a solid dielectric material.

The semiconductor layers 10, 12, 14, 16 and the airgaps 37, 39, 41 in the alternating periodic arrangement provide periods characterized by a refractive index that likewise alternates to constitute the distributed Bragg reflector. For example, the airgap 37 and the semiconductor layer 10 may define a period of the distributed Bragg reflector. Incident light is partially reflects at each of the layer-airgap boundaries, which may reduce the amount of light that is lost to the substrate 18 during use. The permittivity of the airgaps 37, 39, 41 is significantly lower than the permittivity of solid dielectric material, which operates to significantly increase the index contrast at the layer-airgap boundaries.

In an alternative embodiment, the airgaps 37, 39, 41 may be formed before the device structure 20 is formed. A hardmask may be applied to the semiconductor layer 10, used to pattern the openings 34, and then removed before forming the device structure 20.

Figure 5:
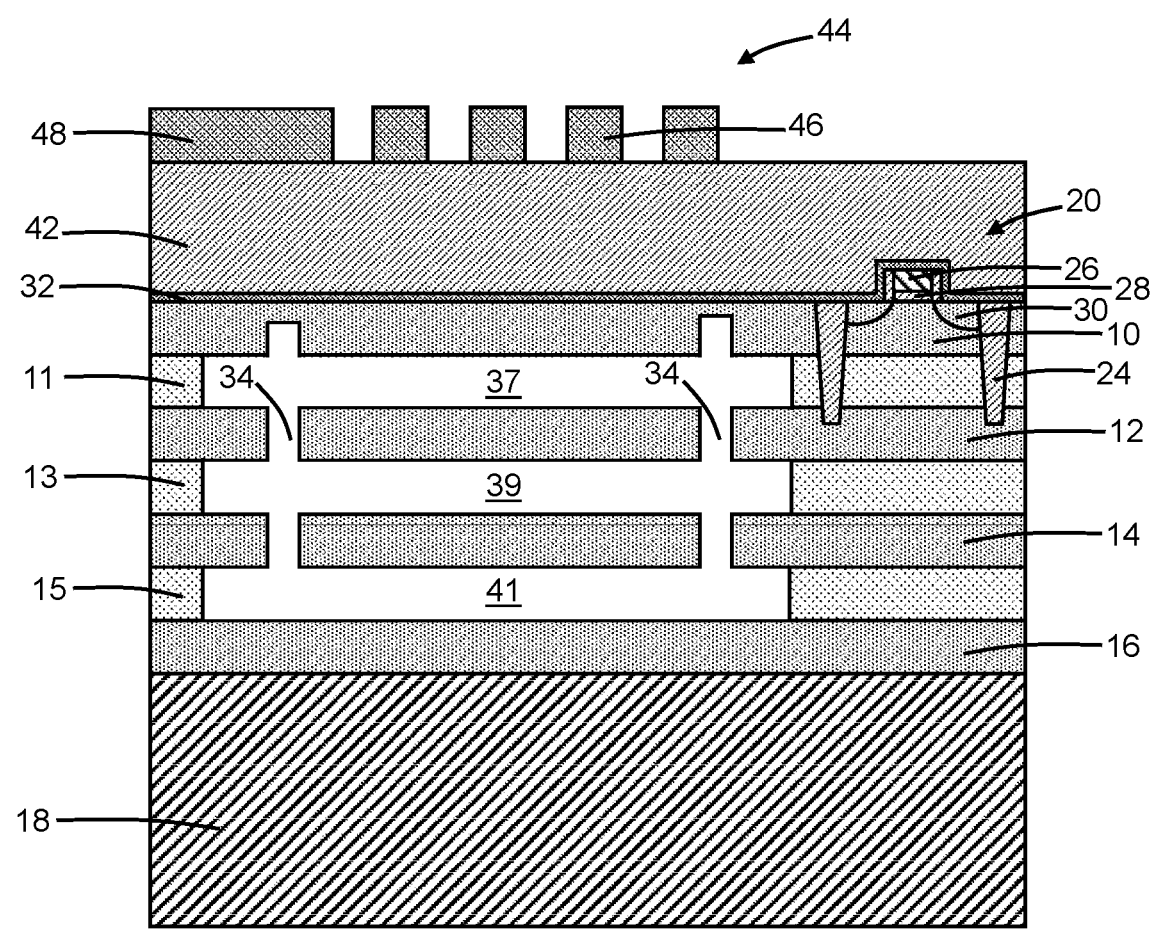
FIGS. 5-7 are cross-sectional views of structures in accordance with alternative embodiments of the invention.

With reference to FIG. 5 in which like reference numerals refer to like features in FIG. 4 and at a subsequent fabrication stage of the processing method, a Bragg grating coupler 44 may be formed as an optical component on the dielectric layer 42. The Bragg grating coupler 44 may be positioned to overlap with the airgaps 37, 39, 41, which are positioned in a vertical direction between the Bragg grating coupler 44 and the substrate 18. In a representative embodiment, the Bragg grating coupler 44 may have periods or segments 46, and a waveguide core 48 may be positioned adjacent to the segments 46 of the Bragg grating coupler 44. The segments 46 may be separated by grooves that may extend to the dielectric layer 42 to define respective gaps arranged between adjacent pairs of segments 46. In an embodiment, the Bragg grating coupler 44 may be comprised of silicon nitride that is patterned by lithography and etching processes from a silicon nitride layer deposited on the dielectric layer 42. In an alternative embodiment, the segments 46 may be shaped as curved arcs instead of being shaped as rectangular pegs.

In use, light, such as laser light, may be guided on a photonics chip to the segments 46 of the Bragg grating coupler 44 by the waveguide core 48. The Bragg grating coupler 44 may diffract the light off of the photonics chip. Alternatively, the Bragg grating coupler 44 may receive incident light originating from off of the photonics chip and diffract the incident light into the waveguide core 48 to be guided to optical components on the photonics chip. Incident light directed toward the substrate 18 is partially reflects at each of the layer-airgap boundaries of the distributed Bragg reflector, which may reduce the amount of light that is lost to the substrate 18 and enhance the efficiency of optical coupling during use. The distributed Bragg reflector may also function to improve the optical bandwidth at the wavelength of interest.

Figure 6:
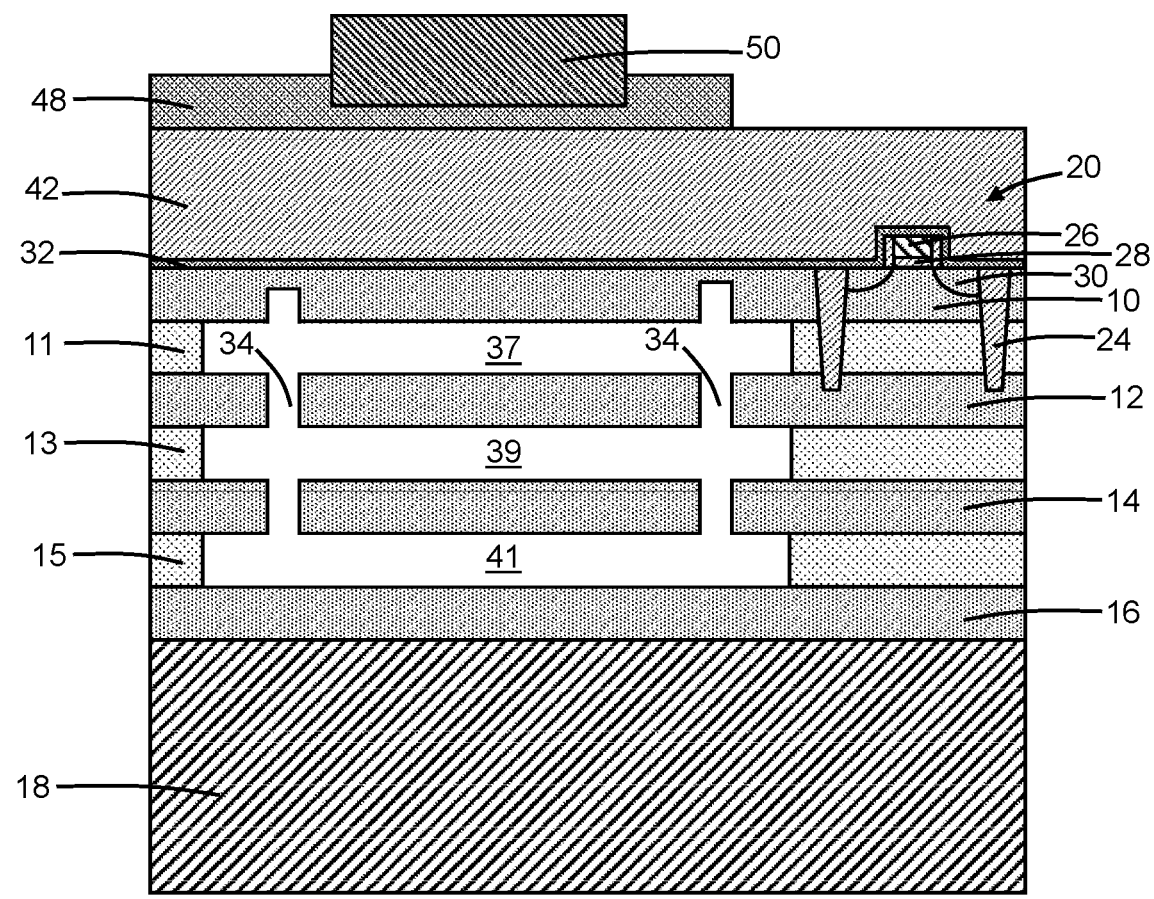

With reference to FIG. 6 in which like reference numerals refer to like features in FIG. 5 and in accordance with alternative embodiments of the invention, a photodetector 50 may be formed as the optical component that is optically coupled to the waveguide core 48 instead of the Bragg grating coupler 44. The photodetector 50 may be comprised of germanium, or a different material, that is capable of converting light in optical signals received from the waveguide core 48 into pulses of electrical current by the photoelectric effect. The photodetector 50 may be partially embedded in a trench patterned in the waveguide core 48.

Figure 7:
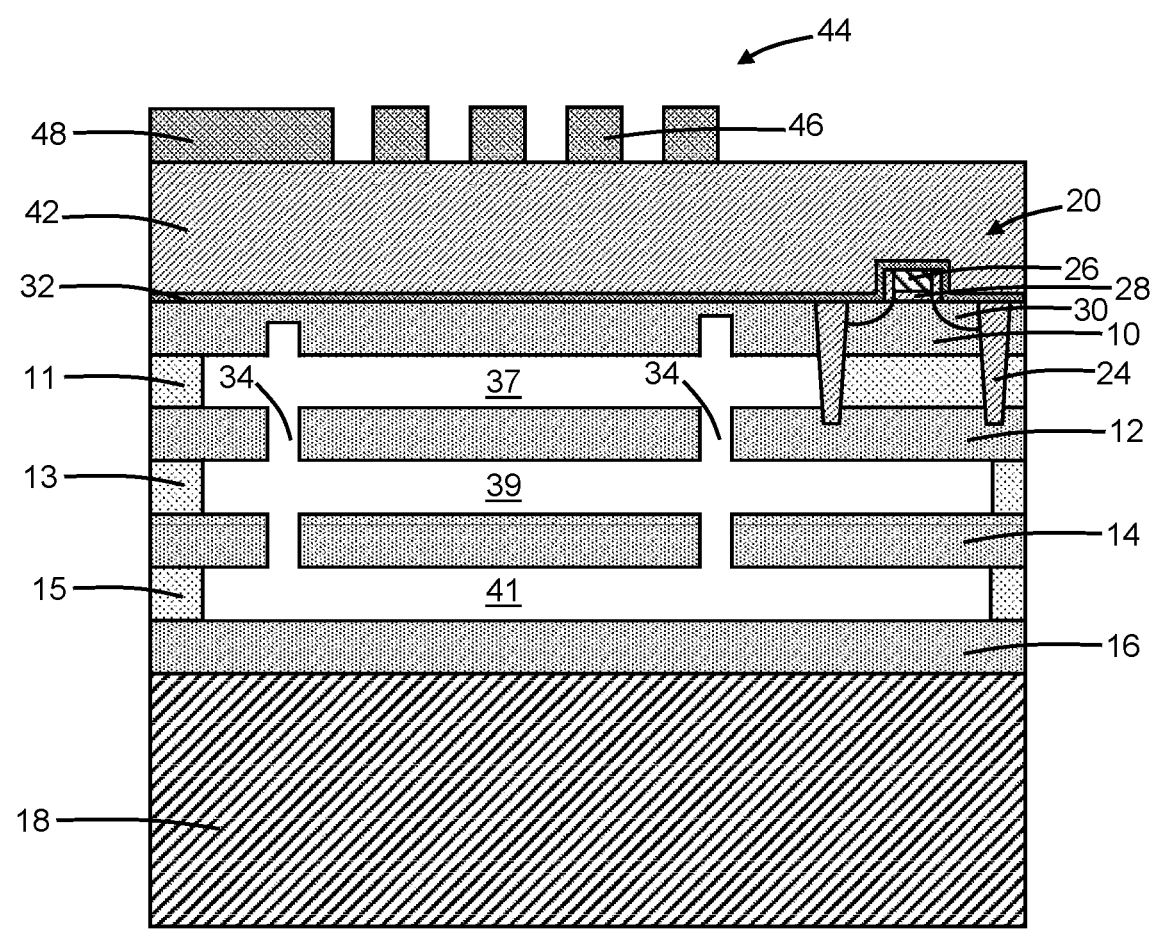

With reference to FIG. 7 in which like reference numerals refer to like features in FIG. 5 and in accordance with alternative embodiments of the invention, the airgaps 39, 41 may be extended beneath the device structure 20. The shallow trench isolation region 24 may block the etching of the portion of the semiconductor layer 11 beneath the device structure 20. The reduced dielectric constant of the airgaps 39, 41 may operate to reduce the capacitive coupling between device structure 20 and the substrate 18.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate+/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a substrate;
   an optical component;
   a distributed Bragg reflector positioned between the optical component and the substrate, the distributed Bragg reflector including a plurality of airgaps and a plurality of silicon layers that alternate in a vertical direction with the plurality of airgaps to define a plurality of periods;
   a semiconductor layer arranged at a periphery of each airgap, the semiconductor layer comprising silicon-germanium; and
   a field-effect transistor including a source/drain region in one of the plurality of silicon layers, wherein the plurality of silicon layers and the semiconductor layer arranged at the periphery of each airgap extend beneath the field-effect transistor.

2. The structure of claim 1 further comprising:
a dielectric layer arranged to fully separate the distributed Bragg reflector from the optical component.

3. The structure of claim 2 wherein the dielectric layer comprises silicon dioxide.

4. The structure of claim 1 wherein the plurality of airgaps and the plurality of silicon layers are arranged in pairs with a periodic arrangement.

5. The structure of claim 1 wherein the optical component is a photodetector.

6. The structure of claim 1 wherein the optical component is a Bragg grating coupler.

7. The structure of claim 6 wherein the Bragg grating coupler comprises silicon nitride.

8. The structure of claim 1 wherein the optical component comprises silicon nitride.

9. A structure of for a photonics chip, the structure comprising:
a substrate;
an optical component;
a distributed Bragg reflector positioned between the optical component and the substrate, the distributed Bragg reflector including a plurality of airgaps and a plurality of silicon layers that alternate in a vertical direction with the plurality of airgaps to define a plurality of periods; and
a field-effect transistor including a source/drain region in one of the plurality of silicon layers,
wherein the plurality of airgaps extend laterally beneath the field-effect transistor, and the plurality of airgaps are positioned in the vertical direction between the field-effect transistor and the substrate.

10. The structure of claim 9 wherein the optical component comprises silicon nitride.

11. The structure of claim 9 wherein the optical component is a Bragg grating coupler.

12. The structure of claim 9 further comprising:
a dielectric layer arranged to fully separate the distributed Bragg reflector from the optical component.

13. The structure of claim 12 wherein the dielectric layer comprises silicon dioxide.

14. The structure of claim 12 wherein the field-effect transistor is positioned in the vertical direction between the plurality of airgaps and the dielectric layer.

15. The structure of claim 9 further comprising:
a semiconductor layer arranged at a periphery of each airgap, the semiconductor layer comprising silicon-germanium.

16. A method of forming a structure for a photonics chip, the method comprising:
forming an optical component;
forming a distributed Bragg reflector including a plurality of airgaps and a plurality of silicon layers that alternate in a vertical direction with the plurality of airgaps to define a plurality of periods; and
forming a field-effect transistor that includes a source/drain region in one of the plurality of silicon layers,
wherein the distributed Bragg reflector is positioned between the optical component and a substrate, the plurality of airgaps extend laterally beneath the field-effect transistor, and the plurality of airgaps are positioned in the vertical direction between the field-effect transistor and the substrate.

17. The method of claim 16 wherein forming the distributed Bragg reflector including the plurality of airgaps and the plurality of silicon layers that alternate in the vertical direction with the plurality of airgaps to define the plurality of periods comprises:
forming a layer stack that includes the plurality of silicon layers and a plurality of silicon-germanium layers that alternate in the vertical direction with the plurality of silicon layers; and
removing a portion of each of the plurality of silicon-germanium layers with an isotropic etching process to define the plurality of airgaps.

18. The method of claim 17 wherein forming the distributed Bragg reflector including the plurality of airgaps and the plurality of silicon layers that alternate in the vertical direction with the plurality of airgaps to define the plurality of periods further comprises:
forming a plurality of openings that extend in the vertical direction through the layer stack to provide access for the isotropic etching process; and
depositing a dielectric layer on the distributed Bragg reflector that seals the plurality of openings.

19. The method of claim 18 wherein the field-effect transistor is positioned in the vertical direction between the dielectric layer and the plurality of airgaps.

20. The method of claim 16 wherein a semiconductor layer is arranged at a periphery of each airgap, and the semiconductor layer comprises silicon-germanium.

* * * * *